Figure 1:
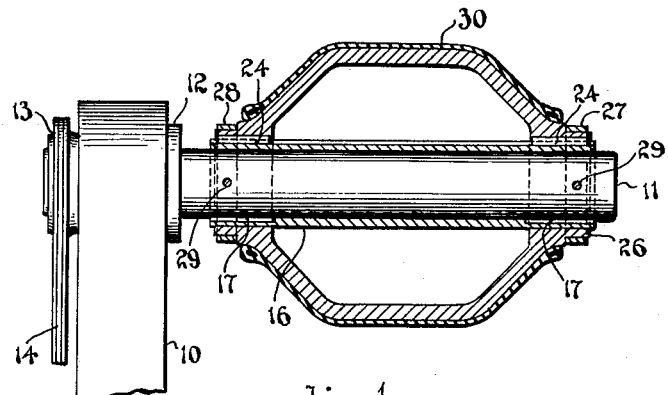

March 27, 1934.  J. S. WARD  1,952,399

CORE FOR BUILDING SUPERBALLOON TIRES

Filed April 11, 1930

Inventor
John S. Ward

By
Attorney

Patented Mar. 27, 1934

1,952,399

UNITED STATES PATENT OFFICE 1,952,399

CORE FOR BUILDING SUPERBALLOON TIRES

John S. Ward, Akron, Ohio, assignor to Wingfoot Corporation, Wilmington, Del., a corporation of Delaware Application April 11, 1930, Serial No. 443,396

10 Claims. (Cl. 154—9)

This invention relates to method of and apparatus for constructing pneumatic tires for vehicles and it has particular relation to the provision of methods and apparatus which are peculiarly designed for the assembly of tires having bead diameters which are small in comparison to the overall diameter.

One object of the invention is to provide a core structure which may readily be collapsed and removed from tires of the above described characteristics upon completion of the assembly thereof.

Another object of the invention is to provide a method of assembling tires in which excessive cramping or compression of the cords of the fabric employed in the construction of the carcass in the zones about the beads is obviated while, at the same time, excessive spreading of the cords in the tread portion of the tire is prevented.

In the manufacture of pneumatic tires, two methods, one termed "the flat built" and the other "the core built" are ordinarily employed. In practicing the first mentioned method fabric plies are assembled upon a core of substantially cylindrical contour and after having been assembled, they are removed from the core and the tread zones thereof are subjected to expansion either by the application of fluid pressure or by the action of an expansible core, either of which functions to distend the tread portion of the tire bands and to bring the beads of the tires into proximity to each other.

According to the second described method, the various plies of fabric, together with the beads and other elements of the tire, are assembled upon a toroidal core of substantially the same contour as the finished tire. In this case, the step of shaping the carcass is obviated. Both of these methods are subject to certain objections.

In the flat built method, the cords of the plies of fabric about the beads are subjected to very little, if any, compression and accordingly, there is but little tendency of the fabric to become creased or wrinkled about the beads during the course of manufacture. However, bands assembled according to this method, upon being subjected to shaping, have the tread portions thereof expanded outwardly to such large diameters that the cord count across the tread is accordingly reduced in the case of the larger sizes of tires to such degree as to result in excessive weakening of the carcass.

In the construction of tires by the core built method, the bands of fabric are slipped over the core and, as a result, the cord count remains substantially uniform in the tread zone, both during the process of construction and after completion of the tire. Accordingly, there is no appreciable weakening of the carcass in this zone. However, in the course of stitching the fabric about the core, the portions about the beads of the tires are brought into circles of much smaller diameter than the tread zone and accordingly, the count of cords per inch is increased. In the larger sizes of tires, it is difficult adequately to stitch the plies down without causing wrinkles to form about the beads. These difficulties encountered in connection with the methods heretofore employed become serious problems even in the larger sizes of ordinary vehicle tires in which the ratio of the diameter of the beads to the overall diameter of the carcass seldom, if ever, exceeds one to two and, in most cases, is materially smaller than that value. Recently, a new type of pneumatic tire structure termed the super-balloon type of tire has come into use. In tires of this type, the bead diameter is so small that ordinary wheel structures are obviated and accordingly, the tires usually are mounted directly upon a hub. In such tires, the ratio of the bead diameter to the overall diameter of the tires may be less than one to six and seldom, if ever, is greater than one to three or four. It will be obvious that, in the construction of tires of such small ratio of bead diameter or overall diameter by the old methods, there will be either excessive separation of the cords at the tread zone or excessive crowding thereof about the beads.

This invention consists in the provision of a method of and apparatus for constructing super-balloon type tires in which the defects encountered heretofore are, to a large extent, obviated by subjecting the cords of the tread zones of the tires to a moderate degree of separation and, at the same time, subjecting the portions of the fabric about the beads to a moderate degree of compression. In this way, excessive expansion and compression of the fabric in the carcasses is obviated.

Figure 2:
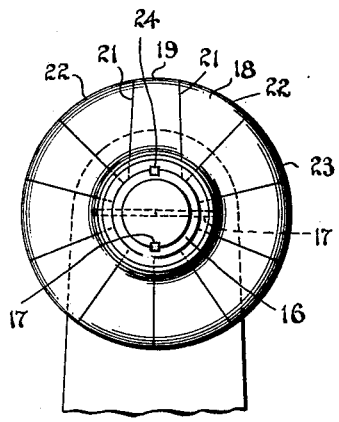

For a better understanding of the invention, reference may now be had to the accompanying drawing, in which:

Fig. 1 is a view, partially in elevation and partially in cross-section, of a drum structure employed in practicing the invention; and Fig. 2 is an end elevational view of the structure disclosed in Fig. 1.

In practicing the invention, a support 10 of a tire building machine is provided with a horizontal rotatable shaft 11, which is journaled within a bearing 12 within the upper portion of the support. The shaft 11 projects outwardly from the support and is provided with a sprocket gear 13 about which is trained a sprocket chain 14 which is connected with any convenient source of power (not shown). The outwardly extending portion of the shaft 11 is provided with a sleeve 16 which is adapted to slide on or off the latter.

As shown in Fig. 2, the sleeve and the shaft are maintained in non-rotatable relation with respect to each other by means of a key 17 of ordinary conventional design. The sleeve functions as a removable support for a drum or core structure 18 comprising a key section 19 having substantially parallel sides 21, which mate with corresponding sides of adjacent core sections 22. Other sides of the sections 22 are disposed in radial relation with respect to the axis of the drum. Segments 23, having radially disposed sides are disposed adjacent to the segments 22 about the sleeve to complete the drum structure. If desired, the key section 19 is splined or keyed, as indicated at 24, to the sleeve 16, whereby to maintain the core segments and the sleeve in non-rotatable relation with respect to each other.

Projecting end portions 26 provided on the segments 19, 22 and 23 are encircled by collars or rings 27 and 28 which serve to maintain the core segments in proper relation with respect to each other while tire bands 30 are being assembled thereon. These rings may be maintained from slipping from the ends of the core sections by means of any convenient instrumentality, for example, by means of keys or pins 29 which extend through mating openings in the collars 27 and 28 and the adjacent sections of the core and thence through a transversely extending opening in the shaft 11. The pins also function to lock the drum, the sleeve 16 and the shaft 11 together and thus prevent relative rotation. If desired, where the pins are used, the keys 17 and 24 may be eliminated.

After the various segments are assembled about the sleeve 16 to form the complete drum or core structure, the rings 27 and 28 are slipped over the end portions 26 to bind the segments in position. The sleeve is then slipped upon the shaft and the pins 29 are slipped into position to maintain the various elements in place. The shaft may then be driven by means of the sprocket chain 14 to rotate the core while the various plies of fabric, together with the other elements of which the tire 30 is composed, are assembled according to usual methods.

Upon completion of the operation of assembling the tire, the pins 29 are removed and the sleeve 16 and core 18, together with the tire, are drawn as a unit from the shaft. The segments composing the core may then be removed from the interior of the tire by first removing the rings 27 and 28, and the key section 19 having parallel sides, the sleeve 16, of course, being removed to permit removal of the key section. The remaining segments 22 and 23 may then be extracted without difficulty. The operation of removing the segments is greatly facilitated because of the arched cross-sectional contour thereof. This is true because it is comparatively easy to force one end of each segment free from the tire carcass and then to swing it downwardly to such position that the remainder of the segments may readily pass through the bead openings of the tires even though the difference between the internal and external diameter of the core or drum may be in excess of the diameter of the bead openings in the tires.

Although I have illustrated but one form of the invention and have described that form in detail, it will be apparent to those skilled in the art that the invention is not so limited but that various modifications may be made therein without departing from the spirit of the invention or from the scope of the appended claims.

What I claim is:

1. In a machine for constructing pneumatic tires, a rotatable shaft, a removable sleeve mounted upon the shaft, a set of segments constituting a drum mounted upon the sleeve, and releasable means for securing the segments to the sleeve.

2. In a machine for constructing pneumatic tires, a rotatable shaft, drum structure including a sleeve of substantially the same internal diameter as the outside diameter of the shaft mounted upon the latter, said drum being movable axially upon and off of the shaft.

3. In a machine for constructing pneumatic tires, a rotatable sleeve, a set of segments arranged about and resting directly upon the sleeve and constituting a tire building drum, and means encircling the segments for securing the segments upon the sleeve.

4. In a machine for constructing pneumatic tires, a rotatable member comprising a central portion and a longitudinally removable sleeve mounted thereon, and a collapsible tire building drum removably mounted upon the sleeve.

5. In a machine for constructing pneumatic tires, a rotatable shaft, a sleeve removably mounted upon the shaft, a plurality of segments disposed about and resting directly upon the sleeve, said segments constituting a hollow tire building drum.

6. A machine for building pneumatic tires of relatively small bead diameter comprising a shaft, a set of detached segments constituting a drum mounted upon the shaft, and means encircling the segments to maintain them in assembled relation.

7. A machine for assembling a pneumatic tire having a relatively small bead diameter in comparison to the overall diameter comprising a rotatable shaft, core segments of arched cross-sectional contour supported by the shaft to form a drum, one of the segments having substantially parallel sides, and collars for securing the segments together upon the shaft.

8. A machine for constructing a pneumatic tire having a relatively small bead diameter in comparison to the overall diameter, comprising a rotatable shaft, means for driving the shaft, a hollow drum slidable on the shaft, said drum being composed of a plurality of segments, one of the segments having substantially parallel sides and the remaining segments having radially formed sides, collars encircling the end portions of the segments for securing them together, and means for securing the collars in position upon the end portions.

9. In a machine for constructing pneumatic tires, in combination, a sleeve, a plurality of sections constituting a tire building form resting directly upon said sleeve, and means encircling said segments for maintaining them in assembled relation.

10. In a machine for constructing pneumatic tires, in combination, a sleeve, a plurality of sections constituting a tire building form resting directly upon said sleeve, said segments having projecting portions arranged substantially parallel with said sleeve, and means encircling said projecting portions for maintaining the sections in assembled relation.

JOHN S. WARD.